United States Patent [19]

Johnson et al.

[11] Patent Number: 4,648,270
[45] Date of Patent: Mar. 10, 1987

[54] MASS FLOWMETER

[75] Inventors: Carl A. Johnson; S. M. Boris Robinson, both of Somerville, Mass.

[73] Assignee: Sirris Flow Technology, Inc., Boston, Mass.

[21] Appl. No.: 745,383

[22] Filed: Jun. 17, 1985

Related U.S. Application Data

[63] Continuation-in-part of Ser. No. 582,251, Feb. 22, 1984, abandoned.

[51] Int. Cl.$^4$ .............................. G01F 5/00; G01F 1/68
[52] U.S. Cl. .......................................... 73/202; 73/204
[58] Field of Search ........................ 73/27 R, 202, 204

[56] References Cited

U.S. PATENT DOCUMENTS

| | | | |
|---|---|---|---|
| 2,586,060 | 2/1952 | Kronberger | 73/204 X |
| 2,813,237 | 11/1957 | Fluegel et al. | 73/204 X |
| 3,106,088 | 10/1963 | Kieselbach | 73/27 |
| 3,220,255 | 11/1965 | Scranton et al. | 73/204 |
| 3,326,040 | 6/1967 | Walsh | 73/204 |
| 3,363,462 | 1/1968 | Sabin | 73/204 |
| 3,805,610 | 4/1974 | Jacobs | 73/202 |
| 3,888,110 | 6/1975 | Clark | 73/27 |
| 3,891,391 | 6/1975 | Boone | 73/204 |
| 3,938,384 | 2/1976 | Blair | 73/204 |
| 3,971,247 | 7/1976 | Rodder | 73/204 |
| 4,157,660 | 6/1979 | Spacek | 73/861.05 |
| 4,400,975 | 8/1983 | McGarr | 73/204 |
| 4,491,024 | 1/1985 | Miller, Jr. | 73/204 |
| 4,542,650 | 9/1985 | Renken et al. | 73/204 |

FOREIGN PATENT DOCUMENTS

110920 7/1982 Japan .................................. 73/204

Primary Examiner—Herbert Goldstein
Attorney, Agent, or Firm—Wolf, Greenfield & Sacks

[57] ABSTRACT

A mass flowmeter uses a transducer comprised of a small block of insulating material. The transducer has a bypass channel and a detector channel passing through it. The bypass channel is used to bypass most of the flow so that the flowmeter can handle a large flow range without overloading the detector. Depending on the flow range to be measured, the bypass channel may contain calibrated resistances to the flow to force appropriate flow amounts to the detector. The detector channel has a carefully controlled cross-section and contains three thermistor beads mounted along a line parallel to the flow direction. The center thermistor is heated by a constant current or constant temperature source. The remaining two thermistors are placed upstream and downstream of the heated thermistor bead at equal distances. The voltages developed across the two outside thermistors due to heat transfer caused by the flow are provided to a differential amplifier to generate a direct mass flow measurement. Linearization circuitry may also be provided to convert the raw differential amplifier output to a signal which varies linearly with the flow rate.

18 Claims, 13 Drawing Figures

MASS FLOWMETER

This application is a continuation-in-part of application Ser. No. 582,251, filed 02/22/84 now abandoned.

FIELD OF THE INVENTION

This invention relates to a mass flow measurement system for fluid flow and in particular to measurement of mass flows over a range of flow rates.

BACKGROUND OF THE INVENTION

There are many environments in which the accurate measurement of fluid flow rates is important for controlling processes and measuring device characteristics. Fluid flow rates are conventionally measured by mass flowmeters which are designed to work over a predetermined range of flow rates which are expressed in standard cubic centimeters per minute (sccm).

Of the devices which are capable of measuring low flow rates (less than 1 sccm), most presently available devices utilize one of two methods for detecting and measuring flow rate. The first method is mechanical motion of barriers placed in the flow. The second method is thermo-convection of heat sources placed in or around the flow.

The most common of the known flowmeter devices which use the first method are called "rotameters". These devices utilize a sphere of known size and density located in a tapered tube. The tube is positioned with its small diameter end downward and the fluid to be measured is introduced at the bottom of the tube. The fluid flow causes the sphere to be pushed upwards in the tube. As the fluid velocity increases, the sphere is forced higher up the tube until its weight matches the force of the flow beneath it. The flow rate can be determined by measuring the position of the sphere vertically within the tube. There are, however, several problems with presently available rotameters. One problem is that it is difficult to electrically sense the position of the sphere, and thus the devices are normally used to make visual flow rate readings by observing the position of the sphere against a scale. A second problem with the known rotameters is that before use, the devices must first be calibrated by creating a calibration chart with known flow rates. A reading taken from the rotameter must be then corrected using the calibration chart. This process introduces errors and can be time-consuming if many readings must be taken. An additional problem is that the reading of such a rotameter is very sensitive to gas density.

There are several known devices which use the second method of flowmetering—thermo-convection. The first class of these devices is the hot-wire anemometer which is a well-known device that measures the cooling of (or the current flow through) a small heated wire placed within the flow. The hot-wire anemometer is capable of providing high speed response with good accuracy for high flow rates but cannot accurately measure flow rates less than 50 sccm.

Another type of thermo-convection device is generally known as the sensor tube system. In this device, a small diameter detection channel is surrounded by three resistance heating/temperature/measuring devices such as thin film thermistors or resistive wires. One device is controlled to produce regulated heat that is directed from the device through the channel walls to the flow within. The other two sensors are placed at equidistant points upstream and downstream of the heated device. Under a no-flow condition, the amount of heat reaching each temperature sensor is equal. With a flow present, however, the fluid stream carries heat from the heated device towards the downstream sensor and thus a temperature differential develops between the upstream and downstream sensors, which temperature differential is proportional to the amount of fluid flow between the two sensors. The temperature difference can be detected as a voltage differential between the sensors by means of a bridge cirucit and an amplifier. The sensor tube arrangement is capable of measuring very low flow rates (less than 1 sccm) but it has the disadvantage that the heat to be detected must transfer by conduction through the tube walls and, accordingly, the measurement requires a long period of time to get stable readings. Thus, rapid, repetitive readings and measurements of transient flows are impossible.

Still another type of thermo-convection device utilizes thermistors placed directly wthin the gas flow rather than temperature sensors placed around it. This device is generally used in very sensitive rate of climb instruments, such as variometers used in sailplanes. Such a variometer consists of a sealed bottle with a thermistor gas flowmeter located in the bottle opening. The flowmeter measures flow into or out of the bottle caused by variations in atmospheric pressure, resulting in a rate-of-climb indication.

Variometer flowmeter instruments are capable of measuring very low flow rates (under 1 sccm) with little or no flow restriction and generally have a fast response time. However, conventional units typically use a thermistor configuration in which the thermistors are mounted on opposite sides of a printed circuit board. Thus, it is difficult to manufacture, calibrate and maintain proper calibration of the instrument throughout its life.

Therefore, it is an object of the present invention to provide a fluid flowmeter which is capable of measuring mass flow rates of less than 0.1 sccm.

It is another object of the present invention to provide a fluid flowmeter which can measure low mass flow rates with a short settling time.

It is a further object of the present invention to provide a mass flowmeter which can be quickly and easily calibrated and which maintains its calibration for long periods of time.

It is yet another object of the present invention to provide a mass flowmeter which can handle a large range of flow rates and produce accurate readings.

SUMMARY OF INVENTION

The foregoing objects are achieved and the foregoing problems are solved in one illustrative embodiment of the invention which uses a transducer comprised of a small block of insulating material. The transducer has a bypass channel and a detector channel passing through it. The bypass channel is used to bypass most of the flow so that the flowmeter can handle a large flow range without overloading the detector. Depending on the flow range to be measured, the bypass channel may contain calibrated resistances to the flow to force appropriate flow amounts to the detector. The detector channel has a carefully controlled cross section and contains three thermistor beads mounted along a line parallel to the flow direction. The center thermistor is heated by a constant current source. The remaining two thermistors are placed upstream and downstream of the heated thermistor bead at equal distances. The voltages developed across the two outside thermistors due to heat transfer caused by the flow are provided to a differential amplifier to generate a direct mass flow measurement. Linearization circuitry may also be provided to convert the raw differenial amplifier output to a signal which varies linearly with the flow rate.

The small size of these thermistors, their location directly within the fluid flow and the fact that the thermistors are electrically very sensitive to small temperature changes result in a very sensitive and rapid mass flow measurement.

DETAILED DESCRIPTION OF THE PREFERRED EMBODIMENT

The inventive mass flowmeter consists of a transducer unit, detection circuitry and linearization circuitry for producing a piece-wise linear flow rate output. The transducer is generally of the detection channel type in which three thermistors are mounted in a channel through which the flow to be measured passes. The center thermistor is heated by means of a constant current source and the temperature of the thermistors on either side of the center thermistors are monitored to detect the flow rate.

Figure 1:
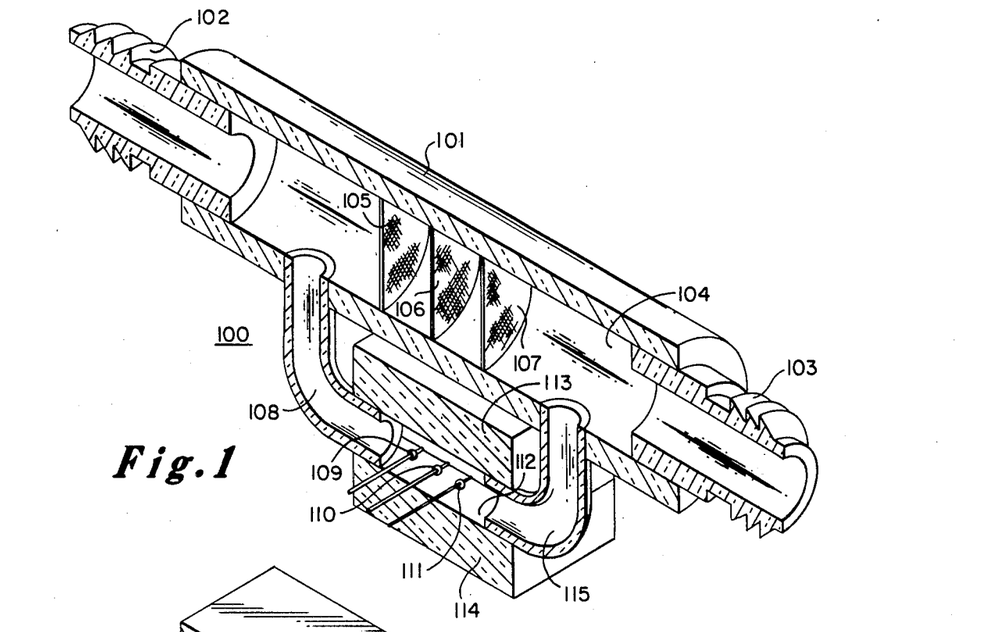
FIG. 1 of the drawing is a perspective cross-sectional drawing of a transducer unit for a mass flowmeter.

FIG. 1 of the drawing shows a cut-away drawing of an inventive transducer for use with an illustrative thermistor flow system. For clarity the tranducer, has been cut-away across the centerline of the flow. The cut-away portion is symmetrical with the portion shown.

Tranducer 100 consists of main body 101 which has a bypass channel 104 therethrough. The body may be constructed of plastic or other material which can be suitably molded. The channel is used to conduct most of the flow so that the detectors in detection channel 112 will not be overloaded. For very low flow rates the bypass channel can be omitted. Illustratively, bypass channel 104 has a circular cross-section but may have other cross-sections. Mounted on each end of channel 104 are standard flow fittings 102 and 103 which can be used to connect the transducer to the remainder of the flow system.

Depending on the flow rate range to be measured channel 104 may be provided with a flow restriction device. In the embodiment shown in FIG. 1, this flow restriction device consists of three porous sintered stainless steel disks 105, 106 and 107. Disks which are suitable for use with the illustrative embodiment are model number SFR 120 disks manufactured by Newmet Products, Inc., located on Route 6, Burr Rd., Terryville, Conn. 06186. Alternatively, metal screens or other flow restriction devices may be used. The purpose of the flow restriction devices is to divert part of the flow through the detection channel 112 by means of right-angle tubes 108 and 115.

Detection channel 114 is illustratively formed by accurately milling a channel in a block of insulating material which prevents heat loss. A suitable insulating material is a glass microballoon and epoxy compound formed by mixing an epoxy resin compound and small glass spheres known as "microballoons". Such material is commonly used in aircraft construction. An epoxy suitable for use in the illustrative embodiment is sold under the name DER 330 Resin/2140 curing agent and manufactured by Columbia Plastics, Inc. located at P.O. Box 275, Columbia, Md. Microballoons can be obtained from Columbia Plastics under the name "Microspheres". The block is formed in two halves 113 and 114 to allow for placement of the thermistors as described below.

In the channel 112 are mounted the three thermistors 109, 110 and 111. As previously described, in operation, thermistor 110 is heated by a current source to a predetermined temperature and the temperature differential between thermistors 109 and 111 is monitored to produce the flow rate output of the device.

Figure 2:
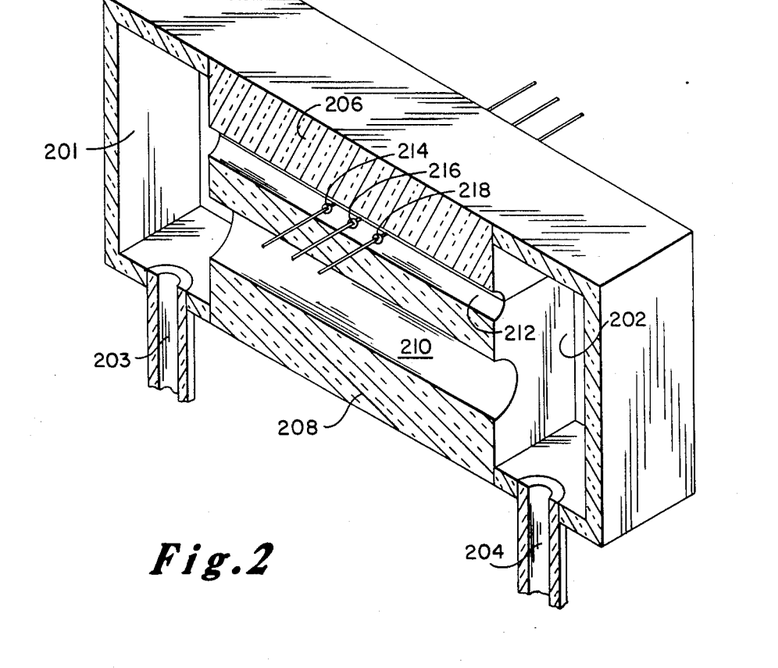
FIG. 2 is a perspective cross-sectional drawing of an alternative embodiment of a tranducer unit for a mass flowmeter.

FIG. 2 shows an alternative embodiment of the transducer shown in FIG. 1. The alternative embodiment consists of four major parts: End caps 201 and 202 and channel blocks 206 and 208.

End caps 201 and 202 serve to perform a transition between the bypass and detection channels, 210 and 212, and the remainder of the system. End piece 201 is conected by flow nozzle 203 to the remainder of the system. Similarly, end piece 202 is connected by flow nozzle 204 to the remainder of the system. End caps 201 and 202 may be formed of plastic or other material suitable for molding and communicate with the channel block assembly comprised of blocks 206 and 208. As with the embodiment shown in FIG. 1, blocks 206 and 208 may be comprised of a suitable insulating material, such as, the microballoon/epoxy composition used in the thermistor housing 114.

Block 208 has a bypass channel 210 machined therethrough and one half of the thermistor detection channel 212. Block 206 has the other half of thermistor channel 212 milled at its center. As with the embodiment shown in FIG. 1, the splitting of channel 212 permits easy insertion of the thermistors 214–218. The relative diameters of channels 210 and 212 are selected so that anywhere between 10–100 percent of the total flow passes through the channel 212.

Thermistors 214–218 are arranged in a similar location as the embodiment shown as FIG. 1 and operate in the same manner.

Figure 3:
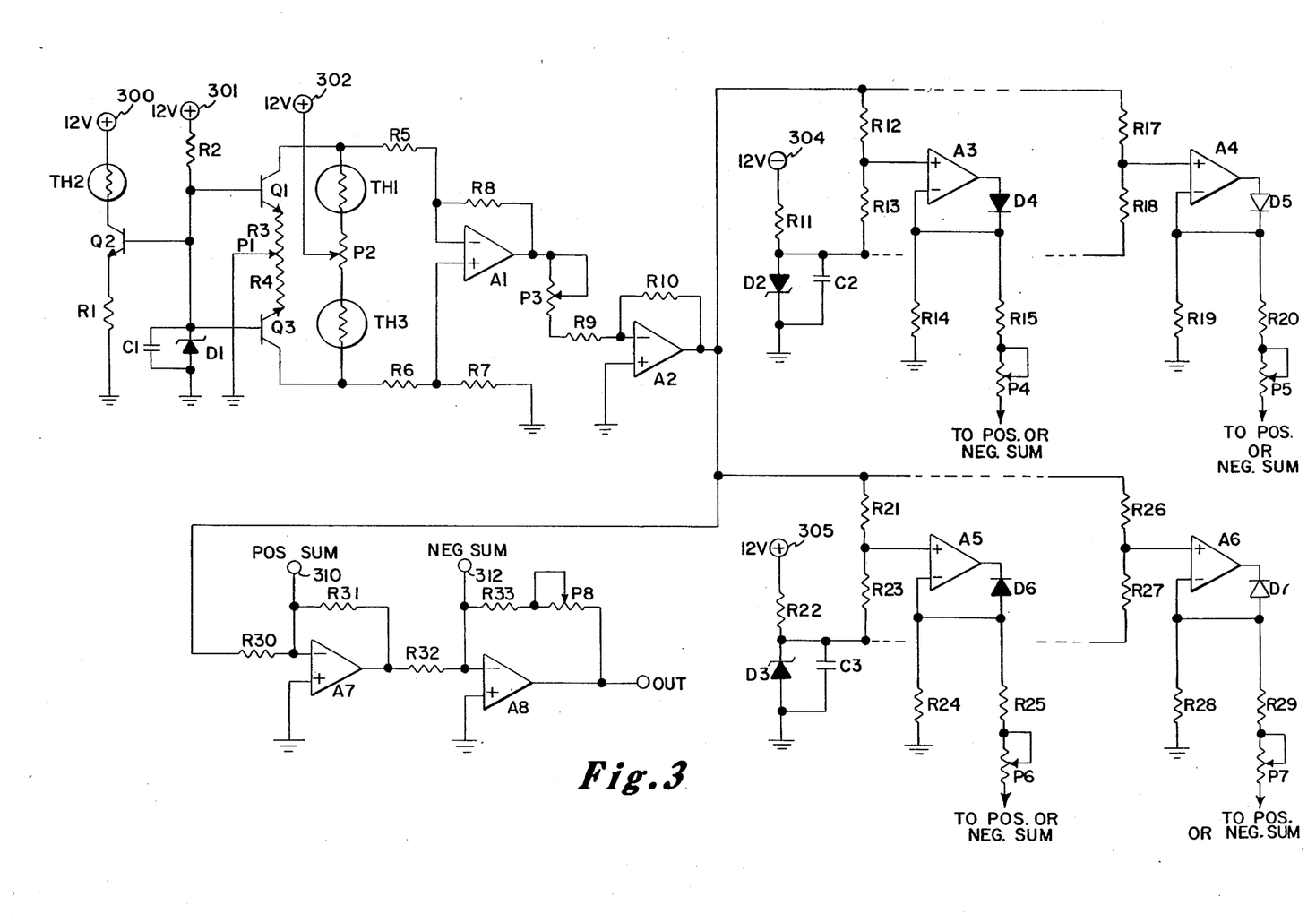
FIG. 3 of the drawing is a schematic diagram of the electrical circuitry for operating the transducer to detect mass flow and for linearizing the transducer output.

FIG. 3 shows an electrical schematic diagram of the circuitry used to process the signals generated by either transducer unit. The thermistors utilized in the transducer unit are designated as devices TH1-TH3 in the upper left corner of FIG. 3. Thermistors suitable for use with the illustrative embodiments are 14 mil. 8,000 ohm±10% thermistor beads manufactured by Thermometrics, Inc. located at 808 U.S. Highway #1, Edison, N.J., 08817. Other thermistors with suitable characteristics may be substituted.

As previously described, the three thermistors are driven by constant current sources so that the center thermistor is heated to a predetermined temperature and the remaining two thermistors are used to sense the heat flow.

In particular, resistor R2, Zener diode D1 and capacitor C1 form a voltage reference source with a voltage of approximately 5 volts and this reference voltage is applied to the bases of transistors Q1-Q3. Since the emitter of transistor Q2 is connected through resistor R1 to ground, transistor Q2 acts as a constant current source and passes a controlled current of approximately 6.3 milliamperes through thermistor TH2. Current passing through thermistor TH2 heats it. Accordingly, as previously described, any fluid flow in the transducer thermistor channel causes an imbalance in the heat received by thermistors TH1 and TH3.

Thermistors TH1 and TH3 are also driven by a constant current provided by transistors Q1 and Q3, respectively. The total current flowing through thermistor TH1 is determined by resistor R3 and the setting of potentiometer P1. Similarly, the total current flowing through thermistor TH3 is determined by R4 and the setting of potentiometer P1. Thus, the current ratio delivered through the two thermistors can be set by adjusting potentiometer P1. This current ratio can be adjusted to achieve the most stable output with ambient temperature variations.

Potentiometer P2 is used to adjust the voltage applied across the two thermistors. Potentiometer P2 can be adjusted to bring the output of the system to zero for calibration purposes.

Resistors R5, R6, R7 and R8 and amplifier A1 form a voltage differential amplifier which produces an output portional to the difference in collector voltages between transistors Q1 and Q3. The collector voltages of transistors Q1 and Q3 are, in turn, proportional to the resistances of thermistors TH1 and TH3, respectively. As previously described, the individual resistance of the thermistors depends upon the amount of heat each receives from thermistor TH2.

The output of amplifier A1 (representing the temperature differential between thermistors TH1 and TH3) is provided by potentiometer P3 and resistor R9 to amplifier A2. Amplifier A2 is connected in a standard negative feedback arrangement and acts as an inverting amplifier with adjustable gain. The gain is controlled by potentiometer P3. The output of amplifier A2 may be either positive (corresponding to flow in one direction) or negative (corresponding to flow in the opposite direction).

The output of amplifier A2 can be used directly in applications where high accuracy and linearity are not required. For other applications, the output must be linearized by the remainder of the circuitry shown in FIG. 3.

The linearization circuitry consists of two sections. The first section consists of a plurality of stages of which two are shown for clarity (these stages include amplifiers A3 and amplifier A4). The actual number of stages used in a particular application varies depending on the characteristics of the thermistors used in the transducer. In the illustrative embodiment eight stages were used in the first section. The first section is used to linearize positive output voltages from amplifier A2.

The second section of the linearization circuitry consists of a plurality of stages of which two are shown for clarity (stages including amplifiers A5 and A6). These stages are used to linearize negative voltages developed by amplifer A2. In the illustrative embodiment eight stages were also used in the second section.

Each stage operates in a similar fashion. In particular, the output of amplifier A2 is provided to one end of a plurality of resistive voltage dividers, for example, in the first section the dividers consisting of resistors R12 and R13, R17 and R18. In the second section the dividers consist of resistors R21 and R23, R26 and R27. The other ends of the voltage dividers in the first section are connected to a voltage reference source formed by resistor R11, Zener diode D2 and capacitor C2. The other ends of the voltage dividers in the second section of the linearization circuit are connected to a voltage source consisting of resistor R22, Zener diode D3 and capacitor C3.

In addition to a voltage divider, each linearization stage consists of an amplifier and each amplifier is arranged with a feedback network including a diode. For example, amplifier A3 includes diode D4 in its feedback network. The divided voltage from the voltage divider associated with the stage is provided to the amplifier input. When the voltage input of amplifier A2 reaches the offset voltage of the amplifier, it switches on and with the diode feedback arrangement the amplifier acts as a voltage follower.

For example, the threshold value of amplifier A3 is set by the resistive divider R12 and R13 and the value of the voltage reference formed by resistors R11 and Zener diode D2. When the threshold voltage is reached, amplifier A3 turns on. Diode D4 causes the amplifier to act as a voltage follower. The output of amplifier A3 is attenuated by resistor R15 and potentiometer P4 and, as described below, provided to the remainder of the linearization circuitry.

The remaining stages in the first and second linearization sections operate in a similar manner with the exception that the threshold voltages of the amplifiers in each stage are set to different values by the associated resistive dividers.

The output of linearization amplifiers A3-A6 may be provided to either the positive summation terminal, 310, of amplifier A7 or the negative summation terminal, 312, of the amplifier A8. These connections are made by jumpers and can be adjusted to suit the individual characteristics of the thermistor beads used in the transducer. A connection of the linearization outputs to the positive summation terminal adds a positive slope to the transducer output curve. Alternatively, a connection of a linearization amplifier output to the negative terminal adds a negative slope to the transducer output curve. By a suitable adjustment of the output attenuation potentiometers in each stage the value of the slope may be changed to provide a linear output.

The output of the linearization circuitry is formed by amplifiers A7 and A8. Amplifier A7 is an inverting summing amplifier which sums the output of the transducer detection circuitry from amplifier A2 (provided via resistor R30) with the outputs developed by the linearization amplifiers applied via the positive summation terminal 310. Amplifier A7 is arranged in a standard negative feedback arrangement by means of resistor R31.

The output of amplifier A7 is, in turn, provided, via resistor R32, to the input of amplifier A8. Amplifier A8 also receives the outputs of the linearization amplifiers via the negative summation terminal 312. Amplifier A8 is arranged in a negative feedback arrangement and acts as an inverting summation amplifier. The overall gain of the system may be changed by adjusting potentiometer P8 which, in conjunction with resistor R33 determines the gain of amplifier A8.

In order to adjust the linearization circuitry to linearize the output of the transducer, a two-stage process is followed. First, a typical set of transducer outputs for a range of flow rates is analyzed to determine the best locations at which to set the linearization stage voltage thresholds. Normally, the threshold values should be set around the least linear portions of the transducer curve. When the threshold values are determined, the resistive dividers and the values of the first and second section voltage references are selected so that at each threshold voltage the resistance ratios cause the input to one linearization amplifier to be at zero voltage.

After all the threshold voltages are established the flowmeter is connected in series with previously-calibrated reference flowmeter. A calibration fluid at a known temperature and pressure is then passed through both flowmeters and the flow rate is slowly adjusted from zero flow to maximum flow with stops at flow rates which result in transducer output voltages slightly less than each of the threshold voltages. At each stop the linearized output is matched to the reference flowmeter output voltage by means of the above-mentioned adjustments. The linearization process may then be repeated for negative transducer outputs.

After the linearization process is complete, the overall system gain can be changed by adjusting potentiometer P8. This adjustment allows for quick calibration for fluids other than the one used for the original calibration.

FIGS. 4-10 show an additional embodiment of the illustrative transducer. In particular, in some applications it is desirable to have the transducer body constructed from heat-conductive materials rather than insulating materials as used in the transducer shown in FIGS. 1 and 2.

It has been found that, when the transducer is made of a heat-conductive substance, the time period between the application of power to the central heating thermistor and the time at which the system has stabilized enough to make a flow measurement is decreased substantially. This reduction occurs because thermal equilibrium is established more rapidly if excess heat is carried out of the detection channel.

Specifically, a portion of the heat given off by the heating thermistor bead radiates to the wall of the detection channel. Since, in the embodiments of FIGS. 1 and 2, the wall is comprised of insulating materials, the wall becomes heated. The heated wall subsequently re-radiates the heat back to the fluid flowing through the channel, in turn, heating it. The heating of the fluid by the channel wall causes perturbations of the readings taken with the instrument until the channel wall reaches a constant temperature. The result is that a transient occurs during the initial turn on of the instrument.

In the embodiment shown in FIGS. 4-10, however, the wall of the detection channel is comprised of a heat-conductive material. Thus, any heat which radiates from the heating thermistor bead to the wall of the detection channel is rapidly carried away by the material surrounding the detection channel wall and little heat remains to be re-radiated back into the fluid. Accordingly, thermal equilibrium is rapidly reached and the instrument can respond to a change in flow rate within a short time for example, less than 100 milliseconds. For some uses such a rapid response time can be advantageous.

FIGS. 4-10 show an illustrative embodiment in which there is no shunt channel. Since all of the flow passes through the detection channel, the instrument is useful for measuring very low flow rates. In particular, the illustrative embodiment is composed of two pieces. These pieces are both constructed with a thermally conductive material, for example, stainless steel.

Figure 6:
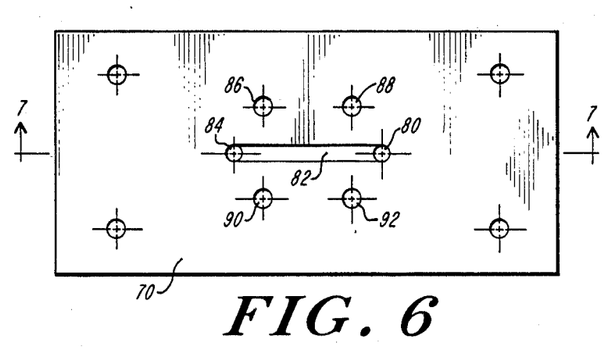
FIG. 6 is a top view of the body of the alternative embodiment.
Figure 7:
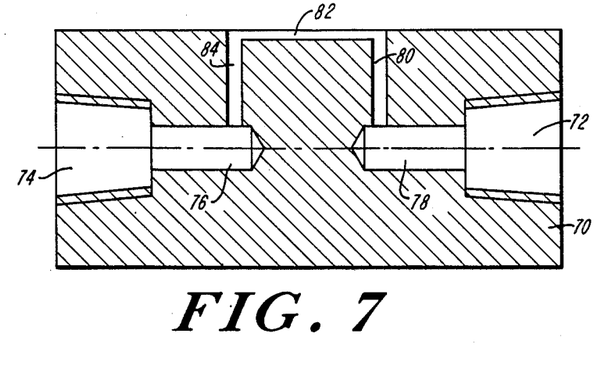
FIG. 7 is a cross-sectional view of the body portion of the alternative transducer.
Figure 8:
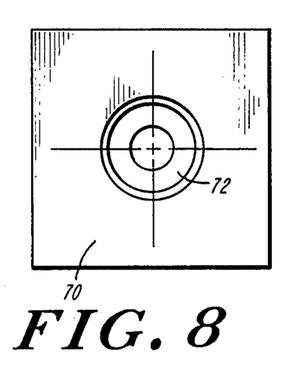
FIG. 8 is an end view of the body portion.

In particular, as shown in FIGS. 6-8, the main body of the transducer is a rectangular block of thermally-conductive material containing a plurality of holes drilled therein to form two inlet ports and a detection channel. More specifically, the body of the material 70 has two tapped inlet ports, 72 and 74, into which standard flow fittings can be threaded. Extending from port 74 is an extension 76 which extends a small distance beyond the inlet port. Similarly, inlet port 72 is provided with an extension 78.

Figure 9:
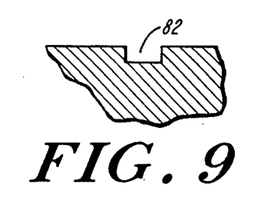
FIG. 9 is a detailed cross-sectional view of the detection channel located in the body portion.

Connected to extension 76 is a hole 84 drilled at right angles through the top of the block which communicates with the extension orifice 76. A similar hole 80 communicates with extension 78. Holes 84 and 80 are, in turn, connected by means of a rectangular notch 82 which forms one-half of the detection channel. A detailed cross-sectional diagram of the notch is shown in FIG. 9.

Figure 4:
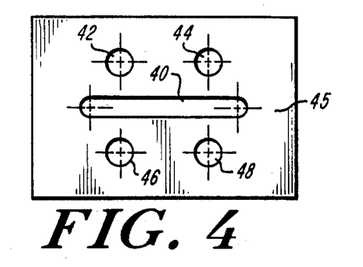
FIG. 4 is a portion of an alternative embodiment showing a top view of a cover piece.
Figure 5:
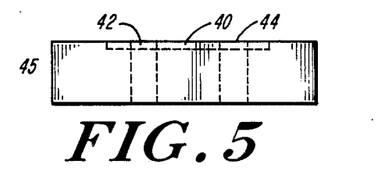
FIG. 5 is a plan view of the cover piece shown in FIG. 4.

The detection channel is completed by a cover piece 45 which is shown in detail in FIGS. 4 and 5. The cover piece contains a notch 40 which may, illustratively, also have the same cross section as notch 82 as shown in FIG. 9. To form the complete detection channel, cover piece 45 is placed on the body 70 with the slots in each piece aligned. Four screws are passed through holes 42-48 in cover piece 45 into threaded holes 86-92 in body 70 to fasten the pieces together.

Figure 10:
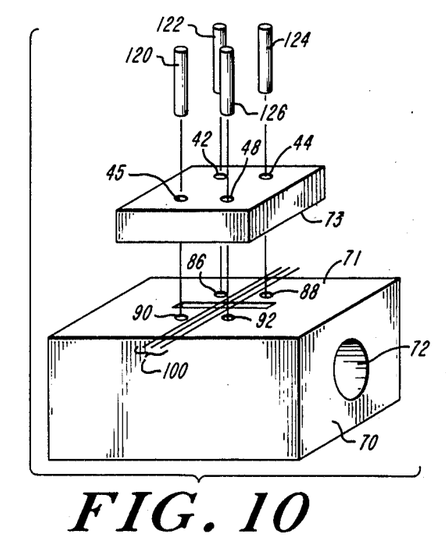
FIG. 10 is a perspective view of the alternative embodiment showing the arrangement of the body and cover pieces.

The arrangement of the elements is as shown in FIG. 10. Prior to assembling body 7 and cover piece 45, the three thermistor beads 100 are laid across the detection channel 82. To avoid electrically shorting the thermistor leads, the top surface 71 of block 70 is covered with a thin layer of insulating material such as TEFLON (TEFLON is a trademark of DuPont de Nemours Inc. for polytetrafluoroethylene). Similarly, the bottom surface 73 of cover piece 45 is also covered with a thin layer of insulating material. The two pieces are then screwed together to form the complete transducer unit.

Figure 11:
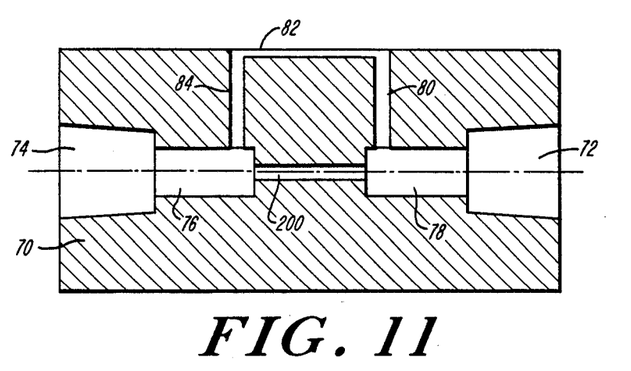
FIG. 11 is a cross-sectional view of another embodiment having a bypass channel.

FIG. 11 shows an additional embodiment of the transducer shown in FIGS. 4-10 in which a bypass channel is employed so that the unit can be used with higher flow rates than is possible with the unit shown in FIGS. 4-10. This latter embodiment may also be comprises of heat-conductive material. In particular, a by-pass channel 200 is drilled between inlet extensions 76 and 78. By-pass channel 200 is sized to provide a sufficient flow rate through the detection channel 82 to operate the sensor electronics.

Figure 12:
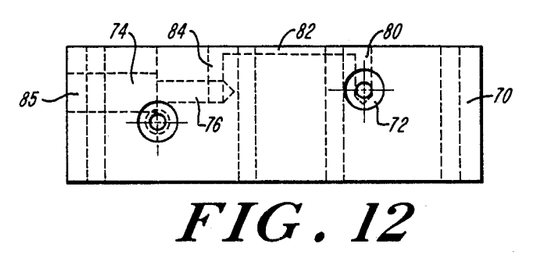
FIG. 12 is a plan view of another embodiment with alternative port locations.
Figure 13:
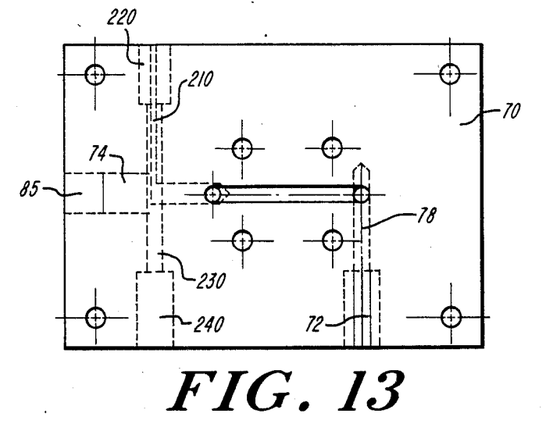
FIG. 13 is the top view of the embodiment shown in FIG. 12.

FIGS. 12 and 13 show an additional embodiment of the illustrative transducer which can be used with a standard proportional solenoid valve. In this embodiment, the fluid flow enters through the flow fitting 72 and proceeds down extension 78 and up vertical pipe 80. The fluid moves through the detection channel (as in the previous embodiments), down the vertical pipe 84 and extension 76. Instead of exiting the unit through port 74 (which has been closed with a plug 850), the flow is forced down channel 210 to a proporational solenoid valve. After passing through the valve, the flow returns via channels 220 and 230 to the outlet port 240. The physical locations of channels ports 210 and 220 correspond to the location of the ports on a solenoid valve.

Although several of the present invention has been described in detail, other variations and modifications within the scope and the spirit of the invention will be immediately apparent to those skilled in the art. For example, the constant current source used to drive the center thermistor can be replaced with a variable source which is controlled by a feedback network that senses the flowmeter output. In this manner, the thermistor current can be automatically adjusted to give a linear flowmeter output thus making the linearization circuitry unnecessary.

What is claimed is:

1. In a mass flowmeter, for measuring fluid flow, said flowmeter having three thermistors arranged in a line parallel to said flow, means to heat the center of one of said thermistors and means to measure the resistance of the remaining two thermistors and means to form the difference of said resistance measurements, an improved transducer housing comprising,
 a block of housing material having a detection channel therethrough, said block of housing material comprising two pieces, said detection channel being divided along an axis parallel to the direction of said flow so that a portion of said detection channel is located in each block piece, said three thermistors being located in said detection channel, and
 a bypass channel through said transducer body containing a flow restricting device; and
 means connecting said bypass channel and said detection channel in parallel so that fluid flows through both channels simultaneously.

2. In a mass flowmeter, the improved transducer housing according to claim 1 wherein said block of housing material is comprised of glass microballoon and epoxy compound.

3. In a mass flowmeter for measuring fluid flow in a flow circuit, said flowmeter having three thermistors arranged in a line parallel to said flow, means to heat the center one of said thermistors and means to measure the resistance of the remaining two thermistors and means to form the difference of said resistance measurements, an improved transducer housing comprising:
 a transducer body containing a bypass channel therethrough;
 means for connecting said bypass channel to said fluid flow circuit;
 flow restriction means located in said bypass channel;
 a block of housing material having a detection channel therethrough, said block of housing material comprising two pieces, said detection channel being divided along an axis parallel to the direction of said flow so that one-half of said detection channel is located in each block piece, said three thermistors being located in said detection channel; and
 means connecting said detection channel to said bypass channel on both sides of said flow restriction means so that fluid flows through both channels simultaneously.

4. In a mass flowmeter, the improved transducer housing according to claim 3 wherein said block of housing material is comprised of glass microballoon and epoxy compound.

5. In a mass flowmeter, the improved transducer housing according to claim 3 wherein said flow restriction means comprises at least one fine mesh screen.

6. In a mass flowmeter, the improved transducer housing according to claim 3 wherein said flow restriction means comprises a porous sintered metal plug.

7. In mass flowmeter, the improved transducer housing according to claim 3 wherein said connection means comprises a pair of L-shaped tubes.

8. In a mass flowmeter for measuring fluid flow in a flow circuit, said flowmeter having three thermistors arranged in a line parallel to said flow, means to heat the center one of said thermistors and means to measure the resistance of the remaining two thermistors and means to form the difference of said resistance measurements, an improved transducer housing comprising:
 a block of housing material having a bypass channel and a detection channel therethrough, said block of housing material comprising two pieces, said bypass channel and a portion of said detection channel being located in one of said block pieces and a portion of said detection channel being located in the other of said block pieces, said three thermistors being located in said detection channel; and
 means connecting said bypass channel and said detection channel to said fluid flow circuit so that fluid flows through both channels simultaneously.

9. In a mass flowmeter, the improved transducer housing according to claim 8 wherein said block of housing material is comprised of glass microballoon and epoxy compound.

10. In a mass flowmeter, the improved transducer housing according to claim 8 wherein said connecting means comprises a pair of hollow end caps, each of said end caps covering both said bypass channel and said detection channel and means for connecting said end caps to said fluid flow circuit.

11. A mass flowmeter for measuring fluid flow in a flow circuit, said flowmeter comprising
 three thermistors arranged in a line parallel to said flow;
 means to heat the center one of said thermistors;
 means to measure the resistance of the remaining two thermistors;
 means to form the difference of said resistance measurements to generate an output signal;
 a transducer body containing a bypass channel therethrough;
 means for connecting said bypass channel to said fluid flow circuit;
 flow restriction means located in said bypass channel;
 a block of insulating material having a detection channel therethrough, said bock of insulating material comprising two pieces, said detection channel being divided along an axis parallel to the flow direction of the fluid in said detection channel so that one-half of said detection channel is located in each block piece, said three thermistors being located in said detection channel; and means connecting said detection channel to said by-pass channel on both sides of said flow restriction means so that fluid flows through both channels simultaneously.

12. A mass flowmeter according to claim 11 further comprising means to linearize the output of said difference forming means.

13. A mass flowmeter according to claim 12 wherein said heating means comprises a constant current source.

14. A mass flowmeter according to claim 13 wherein said measuring means comprises a pair of constant current sources connected to said two thermistors.

15. A mass flowmeter according to claim 14 wherein said difference forming means comprises a voltage difference amplifier.

16. A mass flowmeter according to claim 15 wherein said block of insulating material is comprised of glass microballoon and epoxy compound.

17. A mass flowmeter according to claim 16 wherein said flow restriction means comprises at least one fine mesh screen.

18. A mass flowmeter according to claim 17 wherein said connection means comprises a pair of L-shaped tubes.

* * * * *